United States Patent
Isom et al.

(10) Patent No.: US 7,466,517 B2
(45) Date of Patent: Dec. 16, 2008

(54) UNIFIED SUSPENSION LAMINATE

(75) Inventors: Eric S. Isom, Bloomington, MN (US); Sandeepan Bhattacharya, Eagan, MN (US); Jagdish L. Agrawal, Chaska, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 582 days.

(21) Appl. No.: 11/153,726

(22) Filed: Jun. 15, 2005

(65) Prior Publication Data

US 2006/0285253 A1    Dec. 21, 2006

(51) Int. Cl.
*G11B 5/48* (2006.01)

(52) U.S. Cl. .................................... 360/244.3
(58) Field of Classification Search ............... 360/244.3, 360/244.2, 244.9, 245.1
See application file for complete search history.

(56) References Cited

U.S. PATENT DOCUMENTS

| | | | | |
|---|---|---|---|---|
| 5,187,625 | A * | 2/1993 | Blaeser et al. ............ | 360/244.3 |
| 5,296,983 | A * | 3/1994 | Blanc et al. ............... | 360/244.3 |
| 5,712,748 | A | 1/1998 | Masse ......................... | 360/104 |
| 5,734,524 | A * | 3/1998 | Ruiz ........................... | 360/234 |
| 5,835,310 | A | 11/1998 | Battu .......................... | 360/106 |
| 5,856,896 | A | 1/1999 | Berg ........................... | 360/104 |
| 5,936,806 | A | 8/1999 | Pan et al. .................... | 360/104 |
| 5,955,176 | A * | 9/1999 | Erpelding et al. ........... | 428/209 |
| 6,046,884 | A | 4/2000 | Crane .......................... | 360/104 |
| 6,046,887 | A | 4/2000 | Uozumi et al. .............. | 360/104 |
| 6,078,473 | A | 6/2000 | Crane et al. ................. | 360/104 |
| 6,108,170 | A | 8/2000 | Crawforth ................... | 360/234.3 |
| 6,147,840 | A | 11/2000 | Khan ....................... | 360/245.9 |
| 6,157,520 | A | 12/2000 | Mangold ................... | 360/255 |
| 6,191,915 | B1 | 2/2001 | Takagi et al. .............. | 360/245.7 |
| 6,201,666 | B1 | 3/2001 | Resh ....................... | 360/255.9 |
| 6,215,622 | B1 | 4/2001 | Ruiz et al. ................ | 360/244.3 |
| 6,266,214 | B1 | 7/2001 | Khan ....................... | 360/245.9 |
| 6,271,995 | B1 * | 8/2001 | Fontana et al. ............ | 360/244.3 |
| 6,288,873 | B1 | 9/2001 | Lundquist et al. ......... | 360/234.6 |
| 6,295,185 | B1 | 9/2001 | Stefansky ................ | 360/294.5 |
| 6,324,130 | B1 | 11/2001 | Hatam-Tabrizi .............. | 369/13 |
| 6,351,353 | B1 | 2/2002 | Sluzewski et al. ........ | 360/294.3 |
| 6,366,430 | B1 | 4/2002 | Narayan ................... | 360/244.9 |
| 6,377,425 | B1 | 4/2002 | Khan ....................... | 360/245.9 |

(Continued)

FOREIGN PATENT DOCUMENTS

JP    9106634    4/1997

*Primary Examiner*—Brian E Miller
(74) *Attorney, Agent, or Firm*—Westman, Champlin & Kelly, P.A.

(57) ABSTRACT

One embodiment of the present invention provides a unified suspension that includes an integral, continuous laminate, which has a thick actuator arm portion, a thin pre-load portion, and a beam portion, all formed of the same single laminate. The pre-load portion is integrally connected to the actuator arm portion, is thinner than the actuator arm portion, and is configured to apply a pre-load force. The beam portion is integrally connected to the pre-load portion, and is configured for attaching a gimbal to it. This integral, continuous laminate substantially lowers the mass of the suspension, provides excellent shock, resonance and lift tab performance, lowers power consumption requirements, and simplifies the complexity and cost of manufacturing components for a suspension and for assembling the components of the suspension together and into a larger system of which the suspension is a part.

19 Claims, 3 Drawing Sheets

U.S. PATENT DOCUMENTS

| | | | |
|---|---|---|---|
| 6,381,099 B1 * | 4/2002 | Mei | 360/244.3 |
| 6,385,011 B1 | 5/2002 | Chang | 360/234.3 |
| 6,388,842 B1 | 5/2002 | Murphy | 360/244.8 |
| 6,388,843 B1 | 5/2002 | Takagi et al. | 360/245.7 |
| 6,392,843 B1 | 5/2002 | Murphy | 360/245.3 |
| 6,396,667 B1 | 5/2002 | Zhang | 360/104 |
| 6,417,993 B1 | 7/2002 | Kant | 360/344.6 |
| 6,424,498 B1 | 7/2002 | Patterson | 360/245.7 |
| 6,441,385 B1 | 8/2002 | Khlif | 250/548 |
| 6,449,127 B1 | 9/2002 | Crane | 360/112 |
| 6,496,327 B2 | 12/2002 | Xia | 360/97.03 |
| 6,507,463 B1 | 1/2003 | Boutaghou | 360/294.3 |
| 6,522,503 B2 | 2/2003 | Takadera | 360/245.2 |
| 6,556,383 B2 | 4/2003 | Murphy | 360/244.9 |
| 6,587,309 B2 | 7/2003 | Nojima | 360/245.7 |
| 6,594,115 B2 | 7/2003 | Takagi | 360/245 |
| 6,597,541 B2 | 7/2003 | Nishida | 360/294.4 |
| 6,602,362 B2 | 8/2003 | Tomioka | 148/435 |
| 6,627,909 B2 | 9/2003 | Khlif | 250/548 |
| 6,636,382 B2 * | 10/2003 | Shiraishi | 360/244.3 |
| 6,636,388 B2 | 10/2003 | Stefansky | 360/294.5 |
| 6,650,505 B2 | 11/2003 | Narayan et al. | 360/244.9 |
| 6,661,618 B2 | 12/2003 | Fujiwara et al. | 360/294.4 |
| 6,661,619 B2 | 12/2003 | Nishida et al. | 360/294.4 |
| 6,662,069 B1 | 12/2003 | Khlif | 700/117 |
| 6,687,095 B2 | 2/2004 | McReynolds et al. | 360/365.8 |
| 6,697,226 B1 | 2/2004 | Narayan et al. | 360/245 |
| 6,700,744 B2 | 3/2004 | Nishida et al. | 360/244.2 |
| 6,710,295 B1 | 3/2004 | Tam | 219/121.85 |
| 6,714,386 B1 | 3/2004 | Polycarpou | 360/104 |
| 6,721,133 B2 | 4/2004 | Takagi | 360/244.8 |
| 6,731,465 B2 | 5/2004 | Crane | 360/244.3 |
| 6,731,472 B2 | 5/2004 | Okamoto | 360/294.3 |
| 6,735,050 B2 | 5/2004 | Takagi et al. | 360/244.9 |
| 6,738,226 B1 | 5/2004 | Bhattacharya et al. | 360/245.9 |
| 6,747,849 B1 | 6/2004 | Le et al. | 360/245.7 |
| 6,765,759 B2 | 7/2004 | Bhattacharya et al. | 360/244.2 |
| 6,765,760 B2 | 7/2004 | Saito et al. | 360/244.5 |
| 6,768,612 B2 | 7/2004 | Hanya et al. | 360/244.8 |
| 6,785,094 B2 | 8/2004 | Arya et al. | 360/244.3 |
| 6,798,618 B2 * | 9/2004 | Takagi et al. | 360/244.5 |
| 6,801,402 B1 | 10/2004 | Subrahmanyam et al. | 360/245.9 |
| 6,807,029 B2 | 10/2004 | Someya et al. | 360/245.9 |
| 6,813,119 B2 | 11/2004 | Okamoto et al. | 360/245.2 |
| 6,898,841 B2 * | 5/2005 | Shiraishi | 29/603.04 |
| 6,995,954 B1 * | 2/2006 | Coon | 360/245.9 |
| 7,114,238 B2 * | 10/2006 | Shiraishi | 29/603.03 |
| 7,158,348 B2 * | 1/2007 | Erpelding et al. | 360/245.9 |
| 7,224,554 B2 * | 5/2007 | Wright | 360/244.3 |
| 7,359,157 B2 * | 4/2008 | Takagi et al. | 360/244.3 |
| 7,375,927 B1 * | 5/2008 | Miller | 360/244.3 |
| 7,388,733 B2 * | 6/2008 | Swanson et al. | 360/245.9 |
| 2002/0109943 A1 * | 8/2002 | Crane et al. | 360/244.3 |
| 2002/0181155 A1 * | 12/2002 | Takagi et al. | 360/244.3 |
| 2003/0007289 A1 * | 1/2003 | Shiraishi | 360/244.3 |
| 2003/0035245 A1 * | 2/2003 | Shiraishi | 360/244.3 |
| 2003/0074782 A1 * | 4/2003 | Shiraishi | 29/603.03 |
| 2003/0202283 A1 * | 10/2003 | Arya et al. | 360/244.3 |
| 2003/0202284 A1 * | 10/2003 | Arya | 360/244.3 |
| 2003/0202285 A1 * | 10/2003 | Arya et al. | 360/244.3 |
| 2004/0228037 A1 * | 11/2004 | Wada et al. | 360/244.3 |

* cited by examiner

UNIFIED SUSPENSION LAMINATE

FIELD OF THE INVENTION

The present invention relates generally to laminates, and in particular to an integral, continuous laminate, such as may be comprised in a suspension.

BACKGROUND OF THE INVENTION

Suspensions for small disc drives have typically been made in a three piece form or a four piece form. In a typical three piece construction, a thick arm is welded to a thin beam in a pre-load region, and a gimballed portion is mounted to the thin beam. In a typical four piece construction, a thick arm is attached to a pre-load bend region which in turn is attached to a beam with formed rails, onto which a gimballed portion is mounted.

Data storage devices have tended to be made smaller, yet with greater storage capacity, over time. Some applications have led to interest in "micro" disc drives, such as those that are one inch or smaller, and a fraction of an ounce, such as might be well suited to hand-held or otherwise easily portable devices, such as small music players, PDAs, digital still and video cameras, or external computer memory, for example. Adapting data storage technology to excel in current applications poses considerable technical challenges.

Embodiments of the present invention provide unforeseen advantages over typical suspensions, including promising application in novel data storage systems.

SUMMARY OF THE INVENTION

One embodiment of the present invention provides a unified suspension that includes an integral, continuous laminate, which has a thick actuator arm portion, a thin pre-load portion, and a beam portion, all formed of the same single laminate. The pre-load portion is integrally connected to the actuator arm portion, is thinner than the actuator arm portion, and is configured to apply a pre-load force. The beam portion is integrally connected to the pre-load portion, and is configured for attaching a gimbal to it. This integral, continuous laminate substantially lowers the mass of the suspension, provides excellent shock, resonance and lift tab performance, lowers power consumption requirements, and simplifies the complexity and cost of manufacturing components for a suspension and for assembling the components of the suspension together and into a larger system of which the suspension is a part.

Another embodiment of the present invention pertains to a suspension that includes an integral, continuous laminate and a gimbal. The integral, continuous laminate includes an actuator arm portion, a pre-load portion, a beam portion, and a lift tab portion. The pre-load portion is integrally connected to the actuator arm portion, and is thinner than the actuator arm portion. The beam portion is integrally connected to the pre-load portion, and includes means for attaching the gimbal to it. The lift tab portion is integrally connected to the beam portion. The actuator arm portion, the pre-load portion, the beam portion, and the lift tab portion jointly form a single integral and continuous component. The gimbal is mounted on the beam portion.

Another embodiment of the present invention pertains to a data storage system. The data storage system includes a deck, a media surface configured to be rotatably mounted adjacent to the deck, a suspension being rotatably mounted on the deck, and a head-bearing slider. The suspension includes an integral, continuous laminate and a gimbal mounted on the laminate, with the slider being mounted on the gimbal. This configures the slider to be suspended from the gimbal above the media surface. The integral, continuous laminate is selectively etched to form an actuator arm portion, a pre-load portion, and a beam portion. The pre-load portion is integrally connected to the actuator arm portion, and the beam portion is integrally connected to the pre-load portion. The pre-load portion is thinner than the actuator arm portion, and is configured to apply a pre-load force toward the media surface. The beam portion is configured for attaching the gimbal to it.

Other features and benefits that characterize various embodiments of the present invention will be apparent upon reading the following detailed description and review of the associated drawings.

DETAILED DESCRIPTION OF ILLUSTRATIVE EMBODIMENTS

Figure 1:
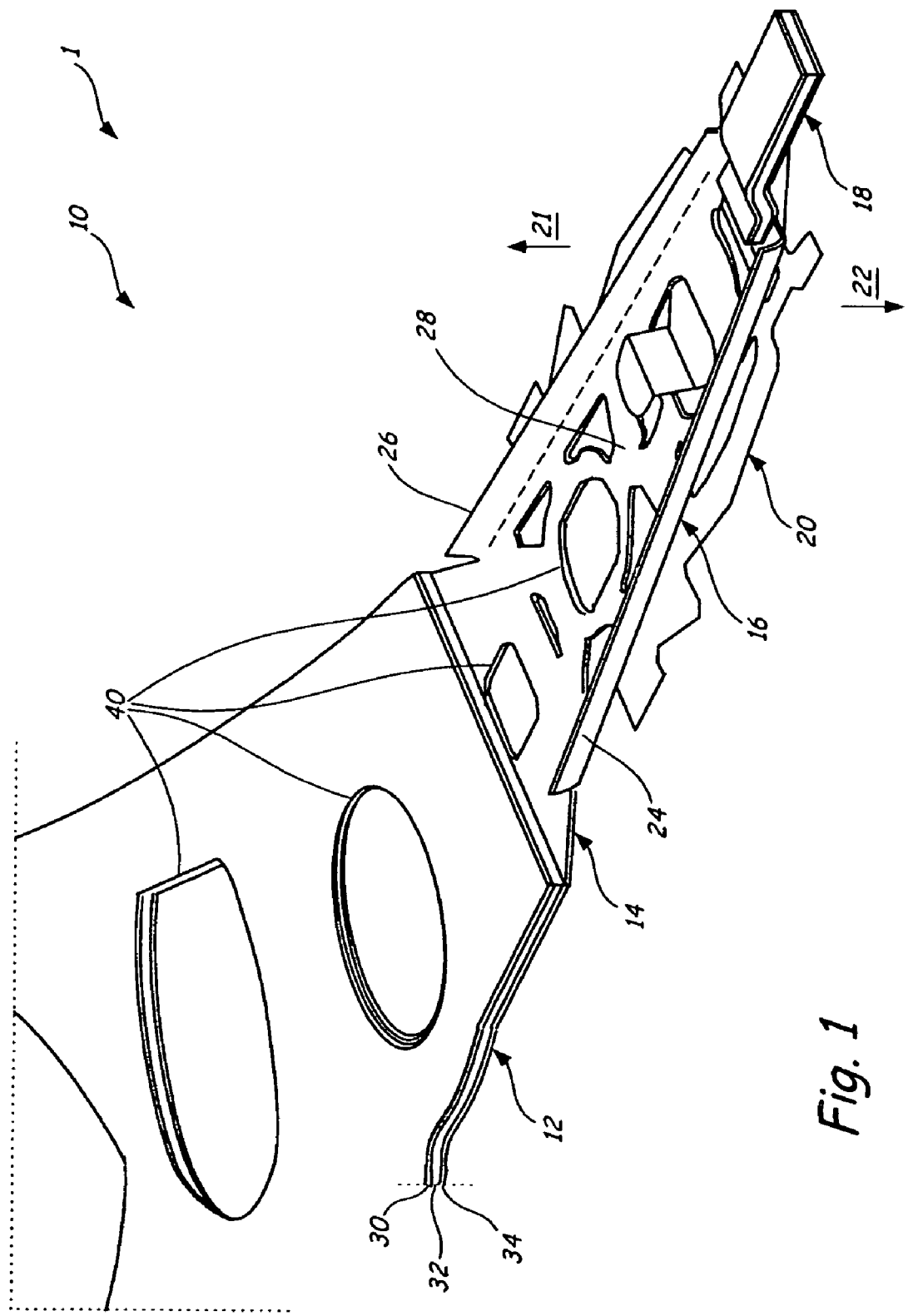
FIG. 1 is a perspective view of a unified suspension comprising an integral, continuous laminate, according to one illustrative embodiment.

FIG. 1 is a perspective view of a unified suspension 1 comprising an integral, continuous laminate 10, according to one illustrative embodiment. Laminate 10 includes a thick actuator arm portion 12, a thin pre-load portion 14, a beam portion 16, and a lift tab 18, all of which are formed of the same integral, continuous laminate 10, in this illustrative embodiment. This substantially lowers the mass of the suspension; provides excellent shock, resonance and lift tab performance; lowers power consumption requirements; and simplifies the complexity and cost of manufacturing, in this illustrative embodiment, compared to a typical suspension. Unified suspension 1 also includes gimbal 20, attached to the beam portion 16, in this illustrative embodiment. Suspension 1 is "unified" because, for example, it includes the actuator arm portion 12 along with the other portions of integral, continuous laminate 10 in a single, unified component, in this embodiment.

Suspension 1 is thereby ideal for use, for example, in a "micro" drive, and in applications in which extremely low mass, low power consumption, and good shock performance are high priorities. In addition, suspension 1 includes only two parts: integral laminate 10 and gimbal 20, requiring only one attachment step such as a weld between compatible sections, or some other means for attaching gimbal 20 to beam portion 16 of laminate 10, in this illustrative embodiment. The inherent ease and simplicity of manufacture of laminate 10, as a single, integral part, therefore provide for substantial cost savings.

Laminate 10 is integral, for example, in the sense that it is a single, whole component, or that it was manufactured as a single piece, in this illustrative embodiment. Laminate 10 is also continuous, for example, in the sense that its length can be traversed along a continuous path, without having to pass by a discontinuity, or a section where two separate components were joined together at a seam, in this embodiment. The continuous laminate is stronger and lighter in a given section than a comparable section with a seam or attachment mechanism in an otherwise similarly configured, typical laminate. The actuator arm portion 12, the pre-load portion 14, the beam portion 16, and the lift tab portion 18 thereby jointly form a single integral and continuous component, in this embodiment.

Pre-load portion 14 is thinner than actuator arm portion 12, in this illustrative embodiment. Pre-load portion 14 is configured to apply a pre-load force on the beam portion 16, in a downward direction as indicated by vector 22, for example, in this embodiment. Beam portion 16 is configured for attaching gimbal 20 to it. A head-bearing slider (not depicted in FIG. 1) may be mounted on gimbal 20 and suspended therefrom above a media surface, for example. In this embodiment, the pre-load force applied by pre-load portion 14 is intended to controllably counteract an aerodynamic lift on the slider, and is one component of the sum of forces applied on such a slider to ensure its proper positioning and motion with respect to the media surface, in one application, as those skilled in the art will appreciate.

The integral, continuous laminate 10 includes an upper layer 30 made of a metal, a central layer 32 made of a polymer, and a lower layer 34 made of the metal, in this illustrative embodiment. For example, the metal forming the upper and lower layers 30, 34 may consist of stainless steel, while the central layer 32 may consist of polyimide, in this embodiment. This combination of layers forming laminate 10 provides substantial performance advantages. For example, the stainless steel provides excellent strength and rigidity on the outer layers of laminate 10, while the polyimide provides a strong central layer with high durability and a low coefficient of thermal expansion, among other advantages. Other types of materials may be used in the layers of the laminate 10, such as titanium, carbon fiber, various other polymers or resins, or other materials.

Certain portions of these three layers of laminate 10 are selectively removed, in this illustrative embodiment. Such selective removal may have been achieved by selective etching, for example. In particular, the upper layer 30 and the central layer 32 of the laminate are selectively removed in the pre-load portion 14 and in the beam portion 16, in this embodiment. In contrast, the actuator arm portion 12 and the lift tab portion 18 include all three layers of the laminate through much of their area, making them thicker than the pre-load portion 14 and the beam portion 16, in this embodiment. The greater thickness of laminate 10 in actuator arm portion 12 advantageously provides the appropriate stiffness for higher natural frequencies of the suspension 1, in this embodiment. At the same time, the relative thinness of the pre-load portion 14, etched down to the thin bottom stainless steel layer 34 of the laminate 10, advantageously provides a very low spring rate for pre-load portion 14, in this embodiment.

The beam region 16 is also etched down to the thin bottom stainless steel layer 34 of the laminate 10, in this illustrative embodiment. Additionally, stiffening rails 24, 26 are formed on the edges of beam region 16, providing low mass and high stiffness, contributing thereby to advantageous operative shock and resonance performance of the suspension 1, in this embodiment. The rails 24, 26 are defined by the lateral edges of beam portion 16 disposed at an angle relative to a axially centroidal section 28 of the beam portion 16. The axially centroidal section 28 runs generally along the long axis of beam portion 16, generally from the central section of pre-load portion 14 on one end to the central section of lift tab 18 on the other end, that is, generally along the centroid of beam portion 16. Whereas the axially centroidal section 28 can be defined as being relatively flat, rails 24, 26 are both angled upward from that flat dimension of axially centroidal section 28, thereby providing enhanced stiffness and rigidity to beam portion 16, particularly in the up-and-down dimension, in this embodiment, with reference to vector 21 defined as the up direction, and again to vector 22 defined as the down direction.

In some sections of laminate 10, the upper layer, the central layer, and the lower layer are all selectively removed in one or more sections in the integral, continuous laminate 10, thereby defining mass reduction features 40 in laminate 10, in this illustrative embodiment. (Reference number 40 indicates a representative sampling among a larger number of mass reduction features in integral, continuous laminate 10.) Mass reduction features 40 occur in the actuator arm portion 12, the pre-load portion 14, and the beam portion 16, in this embodiment. Mass reduction features 40 reduce the overall mass of suspension 1, while they are placed in regions of laminate 10 that are relatively unimportant compared to the mechanical stresses experienced by laminate 10, such that the removal of the material in the mass reduction features 40 doesn't have a significant effect on the stiffness and rigidity of suspension 1. Additionally, mass reduction features 40 provide better shock performance, particularly mass reduction features 40 in beam region 16, in this embodiment.

Lift tab portion 18 is integrally connected on one end to the beam portion 16, while a section of the lift tab portion 18 extends upwardly from the beam portion 16, in this illustrative embodiment. The lift tab portion 18 is configured to controllably provide an upward force on beam portion 16, sufficient to selectively lift suspension 1, along with a head-bearing slider mounted on a gimbal 20, attached to beam portion 16, away from a media surface. ("Upward" is again defined as indicated by upward vector 21, in this illustrative embodiment.) Forming the lift tab portion 18 also from the structure of laminate 10, including all three layers 30, 32, 34, provides lift tab portion 18 of laminate 10 with excellent stiffness, such as would not possible where very thin beams are used for a lift tab. The high stiffness of lift tab 18 is highly advantageous in ensuring good shock-resistant performance, particularly in an application in which suspension 1 is incorporated into a storage device in a mobile or portable device. Suspension 1 thereby incorporates a thin beam portion 16 with a particularly low mass and good shock and resonance performance, while maintaining high stiffness in the lift tab portion 18, in a single continuous, integral laminate 10 with a simplified manufacturing process and reduced cost, in this embodiment.

Figure 2:
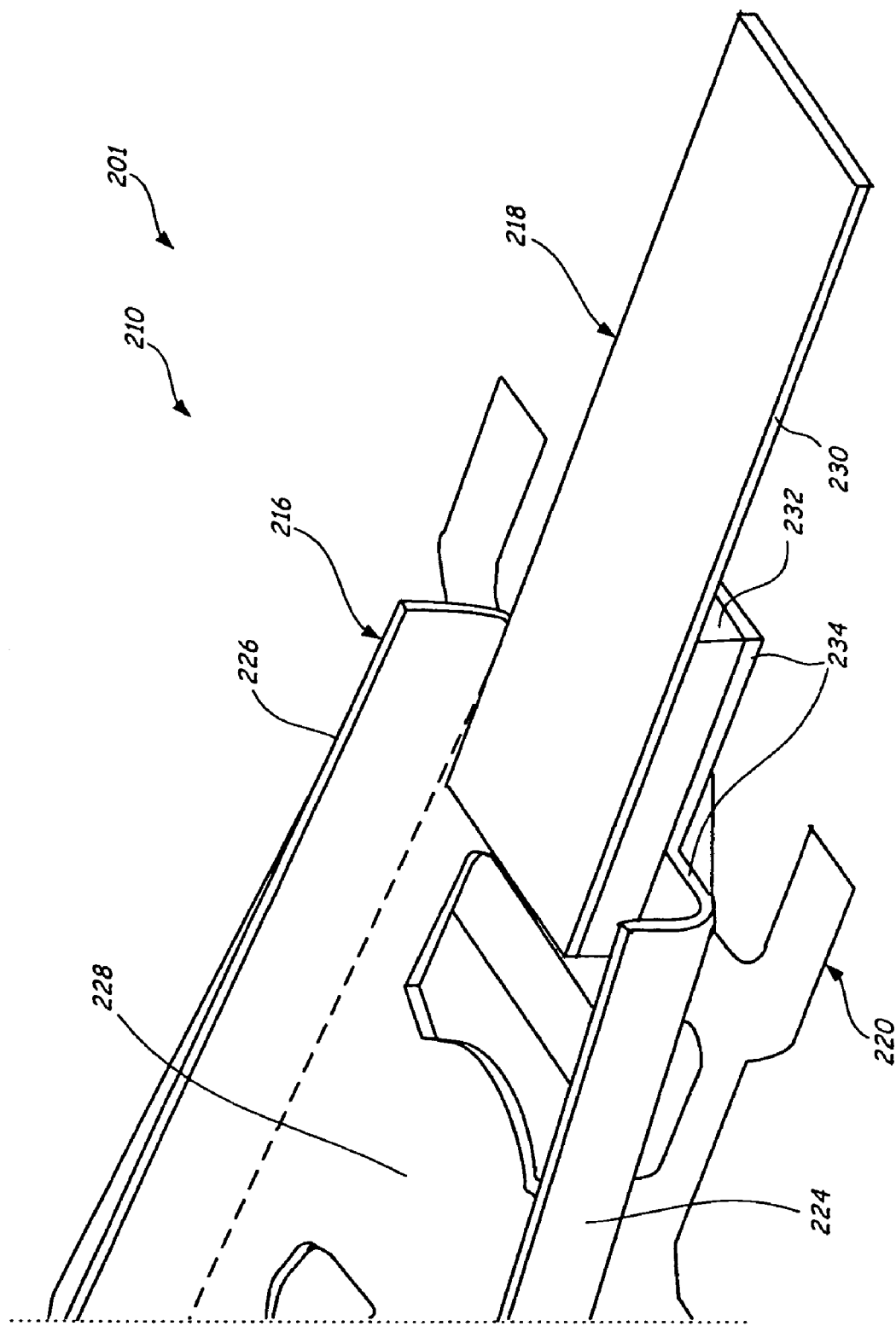
FIG. 2 is a perspective view of a section of a unified suspension comprising an integral, continuous laminate, according to an illustrative embodiment.

FIG. 2 is a perspective view of a section of a suspension 201 comprising an integral, continuous laminate 210 and gimbal 220, according to an illustrative embodiment. Integral, continuous laminate 210 includes an actuator arm portion and a pre-load portion (not depicted in FIG. 2), along with beam portion 216 and lift tab portion 218. Beam portion includes stiffening rails 224, 226 disposed at an angle relative to an axially centroidal section 228 of the beam portion 216, in this embodiment. The integral, continuous laminate 210 comprises an upper layer 230 made of or including a metal, a central layer 232 made of or including a polymer, and a lower layer 234 made of or including the metal, in this embodiment. Upper layer 230 and central layer 232 have been selectively removed in the beam portion 216, that is, in at least one region of the beam portion 216, in this embodiment.

Lift tab portion 218 demonstrates a substantial aspect of the embodiment of FIG. 2, contrasted with the embodiment of FIG. 1. While a section of the lift tab portion 18 extends upwardly from the beam portion 16 in the embodiment of FIG. 1, the lift tab portion 218 of FIG. 2 does not extend upwardly, but rather maintains a flat upper surface while projecting axially away from beam portion 216. Lift tab portion 218 also has had some selective etching done on the bottom thereof, that is, coming up from the down direction, rather than coming down from the up direction, such that the lower layer 234 and central layer 232 are selectively removed in lift tab portion 218. The section of lift tab portion 218 that is axially farther from beam portion 216 therefore has a greater height relative to the downward direction, as is also the case for lift tab portion 18 in FIG. 1, although by a different mechanism, i.e. by extending upwardly rather than by having the lower layers selectively removed. This greater height relative to the down direction becomes important in the context, for example, of application in a data storage system with a media surface (not depicted in FIG. 2) opposing the suspension in the down direction, such that the axially farther end of lift tab portion 218 has a relatively greater height above the media surface, compared to other sections of suspension 201. This is advantageous for configuring the lift tab portion 218 to controllably lift a head-bearing slider (not depicted in FIG. 2) mounted on gimbal 220 away from the media surface. Lift tab portion 218 also has the advantage of having a further reduced mass, due to the absence of sections of the lower layer 234 and central layer 232, thereby contributing to shock and resonance performance, while still retaining the stiffness provided by all three layers of laminate 210 together on the section of lift tab portion 218 axially nearer to beam portion 216, and in a form that can be produced by the simplified and cost-effective manufacturing process of selectively etching integral, continuous laminate 210 as a single integral and continuous component, in this embodiment.

Some experimental measurements were taken in a performance test, in which embodiments similar to those of FIG. 1 and FIG. 2 were compared with a representative conventional suspension. The results of this test are reproduced in the table, below, listing the embodiment similar to that of FIG. 1 as the "first embodiment", and the embodiment similar to that of FIG. 2 as the "second embodiment". For each of the three test subjects, mass is measured in milligrams; spring rate is measured in grams of applied force per inch; static shock to lift-off is given in units of gees (multiples of Earth normal gravity) per gram; first bend, first torsion, second torsion, and sway are given in kilohertz, and lift tab stiffness is given in newtons per meter.

|  | Units | Representative Conventional Suspension | A first embodiment of the invention | A second embodiment of the invention |
|---|---|---|---|---|
| Mass | mg. | 30.1 | 14.1 | 14.03 |
| Spring Rate | gmf./in. | 33.9 | 44.5 | 44.5 |
| Static Shock to Lift-Off | Gs./g. | 572.1 | 495.9 | 530.5 |
| First Bend | kHz. | 5.05 | 4.56 | 4.64 |
| First Torsion | kHz. | 6.02 | 6.97 | 7.14 |
| Second Torsion | kHz. | 12.16 | 12.33 | 12.87 |
| Sway | kHz. | 17.77 | 16.5 | 16.9 |
| Lift Tab Stiffness | N./m. | 147 | 669.2 | 492 |

As is apparent from these results, the embodiments have dramatically lower mass than the representative conventional suspension; they have a greater overall spring rate, lower values for static shock to lift-off and first bend, greater values for first torsion and second torsion, lower values for sway, and dramatically greater values for lift tab stiffness. These results indicate some of the unexpected advantages of the integral, continuous laminate of the respective embodiments. For example, the greatly superior lift tab stiffness demonstrates the surprising advantages from combining different numbers of laminate layers along the axial length of the lift tab portion of the integral, continuous laminate, as described herein.

Figure 3:
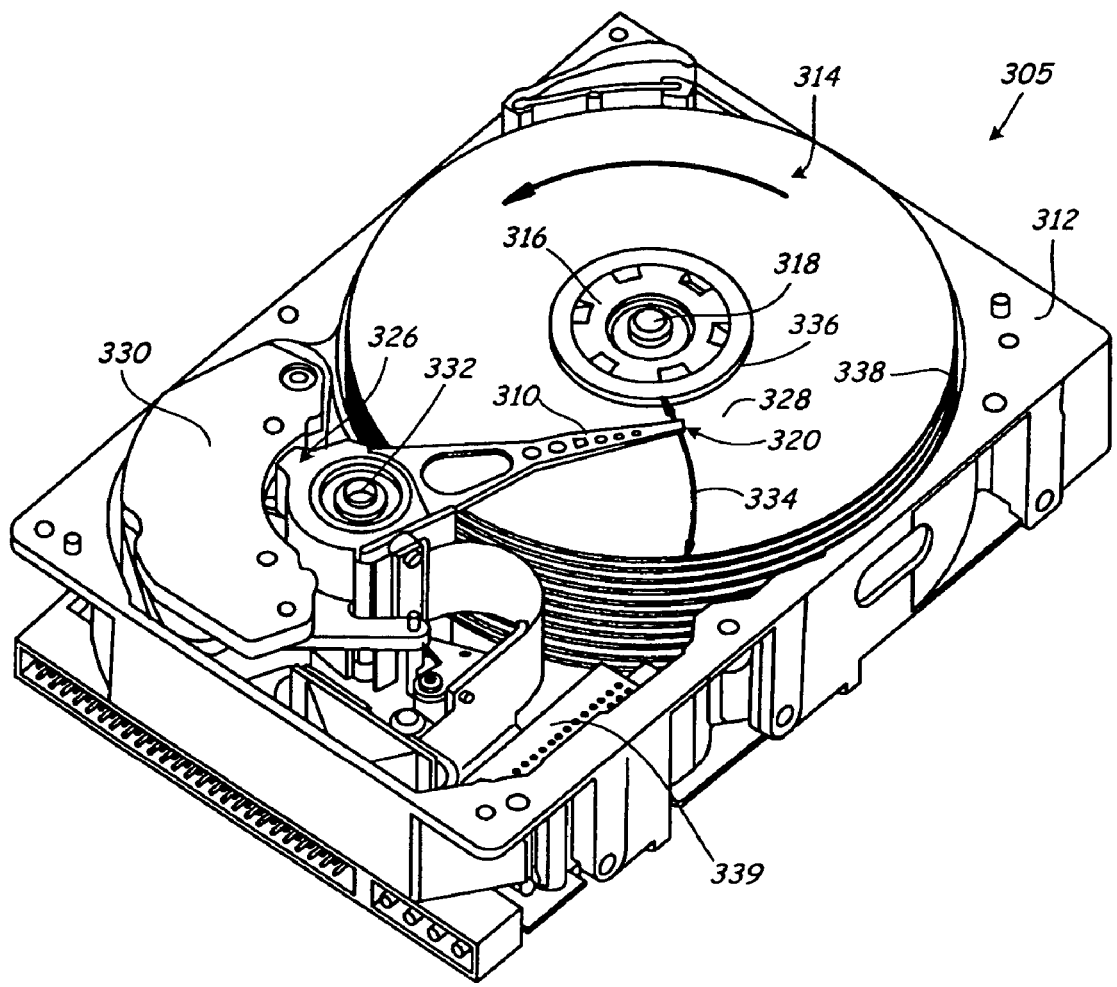
FIG. 3 is an exploded, perspective view of a data storage system comprising an integral, continuous laminate, according to an illustrative embodiment.

FIG. 3 is an exploded, perspective view of a data storage system, disc drive 305, comprising an integral, continuous laminate 310, according to an illustrative embodiment. Disc drive 305 is one example from a variety of data storage systems to which various embodiments are applicable. Disc drive 305 includes a housing with a deck 312 and a top cover (not shown). Disc drive 305 also includes a disc pack 314, which is rotatably mounted adjacent deck 312 on a spindle motor (not shown) by a disc clamp 316. Disc pack 314 includes a plurality of individual discs which are mounted for co-rotation about central axis 318. Each disc surface has an associated slider 320 which is mounted to disc drive 305 and carries a data interface head (not shown), with read and/or write function, on slider 320 for communication with the respective disc surface 328, in this illustrative embodiment.

In FIG. 3, representative slider 320 is supported by suspension 310 which is rotatably mounted on deck 312. More particularly, suspension 310 is rotatably mounted on actuator 326, included on deck 312. Suspension 310 supplies a pre-load force to slider 320 which is substantially normal to opposing disc surface 328. The pre-load force counteracts an aerodynamic lifting force developed between slider 320 and disc surface 328 during the rotation of disc pack 314. Each disc surface is likewise interfaced by a similarly disposed slider (not shown). Actuator 326 is a rotary moving coil actuator and includes a voice coil motor, shown generally at 330, in this illustrative embodiment. Voice coil motor 330 rotates actuator 326 about pivot shaft 332 to position slider 320 over an intended data track (not shown) along a slider range 334 between a disc inner diameter 336 and a disc outer diameter 338. Voice coil motor 330 operates under control of internal circuitry 339.

Slider 320 has a read/write head mounted thereon, configured thereby to be suspended above disc surface 328. The read/write head on head-bearing slider 320 is capable of reading data from and writing data to disc surface 328, in this illustrative embodiment. The read/write heads may be of any type known in the art, including magnetic, magnetoresistive, giant magnetoresistive (GMR), optical, and so forth, in various embodiments. In different embodiments, a wide variety of numbers of discs, with a corresponding number of read/write heads and head-bearing sliders, may occur.

Suspension 310 includes an integral, continuous laminate, and a gimbal (not individually depicted in FIG. 3) mounted thereon, in this illustrative embodiment. The integral, continuous laminate os suspension 310 is selectively etched to form an actuator arm portion, a pre-load portion integrally connected to the actuator arm portion, and a beam portion integrally connected to the pre-load portion. The pre-load portion is thinner than the actuator arm portion, and configured to apply the pre-load force toward disc surface 328. The beam portion is configured for the gimbal to be attached to it, in this embodiment.

As described with respect to the other embodiments discussed above, the integral, continuous laminate of suspension 310 includes an upper layer comprising a metal, a central layer comprising a polymer, and a lower layer comprising the metal, in this illustrative embodiment. The upper layer and the central layer are selectively removed, such as by selective etching, in the pre-load portion and in the beam portion, to achieve desired characteristics of rigidity, stiffness, and low mass, among various other advantages such as those described with respect to the embodiments of FIGS. 1 and 2. The integral, continuous laminate of suspension 310 further includes a lift tab portion, integrally connected to the beam portion, in this illustrative embodiment. The lift tab portion is configured to controllably lift the head-bearing slider 320 away from disc surface 328, in this embodiment.

The present invention therefore includes unexpected and novel advantages as detailed herein and as can be further appreciated from the claims, figures, and description by those skilled in the art. Although some of the embodiments are described in reference to a data storage system, the present invention has various other embodiments with application to other applications of suspensions and of laminates.

It is to be understood that even though numerous characteristics and advantages of various illustrative embodiments of the invention have been set forth in the foregoing description, together with details of the structure and function of various embodiments of the invention, this disclosure is illustrative only, and changes may be made in detail, especially in matters of structure and arrangement of parts within the principles of the present invention, to the full extent indicated by the broad, general meaning of the terms in which the appended claims are expressed. It will be appreciated by those skilled in the art that the teachings of the present invention can be applied to a family of systems, devices, and means encompassed by and equivalent to the examples of embodiments described, without departing from the scope and spirit of the present invention. Further, still other applications for various embodiments, including embodiments pertaining to integral, continuous laminates and data storage systems, are possible.

What is claimed is:

1. An integral, continuous laminate comprising:
   an actuator arm portion;
   a pre-load portion integrally connected to the actuator arm portion, the pre-load portion being thinner than the actuator arm portion and configured to apply a pre-load force; and
   a beam portion integrally connected to the pre-load portion, the beam portion configured for attaching a gimbal thereto;
   wherein the actuator arm portion, the pre-load portion, and the beam portion are formed as portions of the integral, continuous laminate;
   wherein the integral, continuous laminate comprises an upper layer comprising a first material, a central layer comprising a second material, and a lower layer comprising the first material; and
   wherein the actuator arm comprises the upper layer, the central layer, and the lower layer, and the pre-load portion and beam portion comprise the lower layer without the upper layer or the central layer.

2. The integral, continuous laminate of claim 1, wherein the first material comprises a metal, and the second material comprises a polymer.

3. The integral, continuous laminate of claim 2, wherein the metal comprises stainless steel.

4. The integral, continuous laminate of claim 2, wherein the polymer comprises polyimide.

5. The integral, continuous laminate of claim 1, wherein lateral edges of the lower layer in the beam portion are disposed at an angle relative to an axially centroidal section of the beam portion.

6. The integral, continuous laminate of claim 1, wherein the upper layer, the central layer, and the lower layer are selectively removed in one or more sections in the integral, continuous laminate, defining mass reduction features therein.

7. The integral, continuous laminate of claim 1, wherein the beam portion comprises one or more stiffening rails.

8. The integral, continuous laminate of claim 7, wherein the one or more stiffening rails comprise lateral edges of the lower layer in the beam portion.

9. The integral, continuous laminate of claim 1, further comprising a lift tab portion integrally connected to the beam portion.

10. The integral, continuous laminate of claim 9, wherein a section of the lift tab portion extends upwardly from the beam portion.

11. The integral, continuous laminate of claim 9, wherein the unified continuous laminate comprises an upper layer comprising a metal, a central layer comprising a polymer, and a lower layer comprising the metal, and wherein the central layer and the lower layer are selectively removed in the lift tab portion.

12. The integral, continuous laminate of claim 9, wherein the lift tab comprises the upper layer, the central layer, and the lower layer, such that the lower layer is continuous between the lift tab and the beam portion, and the upper layer and central layer are discontinuous between the lift tab and the actuator arm.

13. The integral, continuous laminate of claim 1, further comprising a gimbal mounted on the beam portion.

14. A suspension comprising an integral, continuous laminate and a gimbal, wherein the integral, continuous laminate comprises:
   an actuator arm portion;
   a pre-load portion integrally connected to the actuator arm portion, the pre-load portion being thinner than the actuator arm portion;
   a beam portion integrally connected to the pre-load portion, the beam portion comprising means for attaching a gimbal thereto; and
   a lift tab portion integrally connected to the beam portion;
   and wherein the actuator arm portion, the pre-load portion, the beam portion, and the lift tab portion jointly form a single integral and continuous component, and wherein the gimbal is mounted on the beam portion;
   wherein the integral, continuous laminate comprises an upper layer comprising a first material, a central layer comprising a second material, and a lower layer comprising the first material; and
   wherein the actuator arm and at least a portion of the lift tab comprise the upper layer, the central layer, and the lower layer, and the pre-load portion and beam portion comprise the lower layer without the upper layer or the central layer.

15. The suspension of claim 14, wherein the integral, continuous laminate comprises an upper layer comprising a metal, a central layer comprising a polymer, and a lower layer comprising the metal.

16. The suspension of claim 15, wherein the beam portion comprises one or more rails formed from the lower layer without the upper layer or the central layer.

17. A data storage system comprising:
   a deck;
   a media surface configured to be rotatably mounted adjacent to the deck;
   a suspension comprising an integral, continuous laminate and a gimbal mounted thereon, the suspension being rotatably mounted on the deck; and a head-bearing slider mounted on the gimbal and configured to be suspended therefrom above the media surface;

wherein the integral, continuous laminate is selectively etched to form an actuator arm portion, a pre-load portion integrally connected to the actuator arm portion, and a beam portion integrally connected to the pre-load portion, wherein the pre-load portion is thinner than the actuator arm portion and configured to apply a pre-load force toward the media surface, and the beam portion is configured for attaching the gimbal thereto;

wherein the integral, continuous laminate comprises an upper layer comprising a first material, a central layer comprising a second material, and a lower layer comprising the first material; and wherein the actuator arm and at least a portion of the lift tab comprise portions of the upper layer, the central layer, and the lower layer, and the pre-load portion and beam portion comprise portions of the lower layer without the upper layer or the central layer.

18. The data storage system of claim 17, wherein the upper layer comprises a metal, the central layer comprises a polymer, and the lower layer comprises the metal, wherein the upper layer and the central layer are selectively removed in the pre-load portion and in the beam portion.

19. The data storage system of claim 17, further comprising a lift tab portion integrally connected to the beam portion, wherein the lift tab portion is configured to controllably lift the head-bearing slider away from the media surface.

* * * * *